April 21, 1964 M. McNEIL 3,129,964
COUPLING FOR LIQUID ABSORBENT CONDUIT HAVING A CRUSHABLE SPACER
Filed June 8, 1960
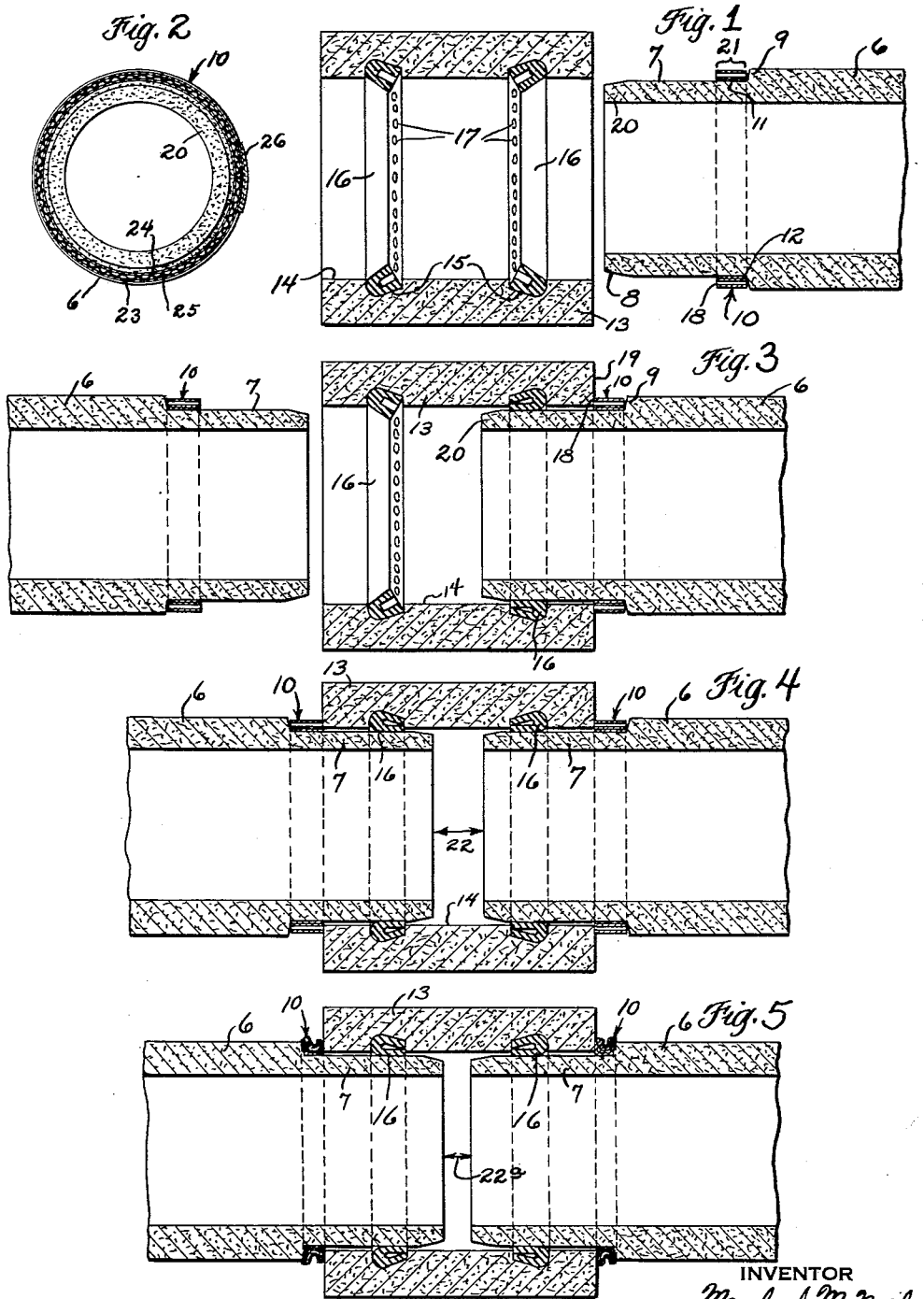
INVENTOR
Manford McNeil
BY
Synnestvedt & Lechner
ATTORNEYS

United States Patent Office 3,129,964
Patented Apr. 21, 1964

3,129,964
COUPLING FOR LIQUID ABSORBENT CONDUIT HAVING A CRUSHABLE SPACER
Manford McNeil, Bellevue, Wash., assignor, by mesne assignments, to Certain-Teed Products Corporation, Ardmore, Pa., a corporation of Maryland
Filed June 8, 1960, Ser. No. 34,715
2 Claims. (Cl. 285—369)

This invention relates to the coupling of individual conduit elements and coupling members, and is of special advantage when used with such elements and members made of asbestos-cement or like material, i.e., material composed essentially of fibrous matter and a hydraulic binder.

More particularly, the invention relates to a device for automatically and conveniently ensuring the proper spacing of assembled conduit elements and coupling members.

The invention is an improvement over that disclosed in the U.S. patent to Altemus et al., No. 2,871,031, January 27, 1959, assigned to the assignee of the present application, which patent is illustrative of the general type of prior art coupling device with which the present invention is intended to be used. The Altemus et al. patent discloses a pipe coupling utilizing a coupling member in the general form of a hollow cylinder of inside diameter slightly greater than the outside diameter of the conduit elements to be joined. The coupling member is provided internally with two annular grooves in which are lodged ring gaskets. A gasket cooperates with the surface of each of the conduit elements in sealing the coupling against ingress and egress of fluid.

The Altemus et al. patent teaches that it is important to assemble the conduit elements into the coupling member in such a way as to retain a space between the ends of the conduit elements into which space the conduit elements can expand without building up stress in the coupling members or conduit elements which might lead to failure. The Altemus et al. patent discloses two means for accomplishing the desired spacing of the conduit elements within the coupling members. One means involves the use of a rubber spacing ring positioned in a central groove within the coupling member and having a special configuration intended to provide for a limitation of the axial assembly of the conduit elements into the coupling member and yet permit expansion of the conduit elements by distortion of the rubber spacing ring. The other spacing device disclosed in the Altemus et al. patent is in the form of a generally U-shaped metal spacing tool adapted to be held in place on a conduit element during assembly of the coupling member and to maintain a sufficient space between the coupling member and a shoulder formed on the conduit element to insure that the ends of the conduit elements within the coupling will not abut each other. After the assembly operation, the U-shaped spacing tool is removed from the conduit element.

The present invention provides a spacing device having a number of advantages over prior types, including those disclosed in the Atlemus et al. patent.

An important object of the invention is the provision of a spacing device for couplings of the kind referred to, which spacing device is simple in construction and automatic and foolproof in operation.

A further object of the invention is the provision of a spacing device adapted to insure positive spacing of conduit elements within a coupling throughout the entire period involved in the assembly of any given length of conduit and even until the conduit is actually subjected to conditions which give rise to axial expansion of the conduit elements.

Still further, the invention has as an object the provision of a spacing device which is relatively inexpensive to manufacture and which is disposable so that it need not be retrieved for re-use but can be left permanently in place.

Yet another object is the provision of such a disposable spacing device which is made of a deformable material, preferably a crushable material, which is stiff enough to resist the normal conduit assembly force and prevent over-insertion of conduits into coupling members and yet will yield when the force of expansion of the conduit element is developed.

In addition, an object of the invention is the provision of a spacing device which contacts the coupling member and a shoulder on the conduit element all the way around the conduit element.

Furthermore, the invention provides for the maintenance of positive spacing even when conduit is assembled at a sharp angle upwardly so that the weight of the conduit elements exerts a force urging the conduit elements into the coupling members.

Other objects and advantages of the invention will be clear from the following description taken in connection with the accompanying drawing in which:

FIGURE 1 is a longitudinal sectional elevation showing a conduit element, with the spacer of the invention assembled thereon, in position for insertion into a coupling member;

FIGURE 2 is an end view of the conduit element and spacer as shown in FIGURE 1, looking toward the right in FIGURE 1;

FIGURE 3 is a sectional elevation similar to FIGURE 1 but showing one conduit element assembled into the coupling member and another conduit element in position for assembly;

FIGURE 4 is a view similar to FIGURE 3 but showing both conduit elements assembled into the coupling member; and FIGURE 5 is a view similar to FIGURE 4 but showing the arrangement of parts after expansion of the conduit elements has taken place and the spacing rings of the invention have been crushed.

Turning to the drawings in more detail, the conduit element 6 may be of any convenient length and any desired diameter and wall thickness. Because manufacturing techniques normally result in a rather irregular exterior surface, it is desirable to provide a smooth and uniformly cylindrical end portion 7 of reduced diameter as compared with the balance of the conduit element, this conveniently being done by means of machining. The edge of the free end of the conduit element may be chamfered as indicated at 8 to facilitate assembly.

Abutment means 9 are provided spaced from the free end of the conduit element a predetermined distance. When the conduit element is of the kind having a reduced end portion 7, the abutment means conveniently takes the form of a shoulder interconnecting the portion of reduced diameter and the balance of the conduit element, this shoulder usually being at a steep angle, almost 90°, with respect to the axis of the conduit element.

In the drawings, the spacing means 10 of the invention takes the form of a thin cylindrical ring having an inside dimension or bore 11 which is sufficient to make possible the assembly of the ring over the reduced end portion 7 of the conduit element. The inside dimension of the surface 11 is such that the ring cannot be slid past the shoulder 9 but rather abuts against the shoulder. The trailing edge 12 of the spacing means 10 comes against the base of the shoulder 9 and prevents further motion of the ring toward the right, as viewed in FIGURE 1.

The coupling member 13 has a bore 14 therethrough of diameter slightly greater than the outside diameter of the reduced end portion 7 of the conduit element. Annular grooves 15 are preferably provided in the coupling member and annular rubber gaskets, such as 16 are positioned in the groove 15. In the device shown in the drawings the gaskets 16 are provided with a plurality of annularly spaced holes 17. It is here mentioned that the details of construction and operation of the coupling members and gaskets, as shown in the drawing, are more fully disclosed and claimed in the Altemus et al. patent identified above.

The conduit element 6 and coupling member 13 are assembled by relative axial telescopic movement toward each other resulting in a positioning as shown in the right-hand portion of FIGURE 3. As there seen, the gasket 16 has been deformed by the end of the conduit element and is now positioned to prevent the passage of fluid or liquid either from inside the conduit outwardly or from outside the conduit inwardly.

Insertion of the conduit element 6 into the coupling member 13 is arrested when the leading edge 18 of the spacing means 10 abuts the end face 19 of the coupling member 13. The outside dimension of the spacing means 10 must be greater than the inside diameter of the bore in the coupling member so that the spacing means will butt up against the end face of coupling member 19 rather than sliding in between the coupling member and the conduit element.

The predetermined distance from the free end 20 of the conduit element to the shoulder 9, the axial dimension 21 of the spacing ring 10, and the axial dimension of the coupling member 13 are selected and interrelated so that, when the conduit element 6 is assembled into the coupling member 13 until the shoulder 9 and end face 19 abut opposite sides of the spacing ring 10, the free end 20 still has freedom for axial expansion without any interference.

This is best seen in FIGURES 4 and 5 in which both conduit elements are shown assembled into the coupling member 13. The distance 22 between the adjacent ends of the conduit elements 6 is sufficient to accommodate axial expansion of the conduit elements. Conduit elements of the kind here involved, when made of asbestos-cement material in average commercial lengths, may expand due to the absorption of moisture a total of as much as ¼ to ⅜ of an inch. Since a coupling between two conduit elements should accommodate at least 50% of the axial expansion of both of the conduit elements joined within it, the axial space 22 should be at least twice the distance that half the conduit element could be expected to expand. Furthermore, it may be that one or both of the conduit elements assembled in a given coupling member abuts some immovable object at its end remote from the coupling. In such case, all of the axial expansion of the conduit element would have to be taken up within one coupling member, and, if this situation occurred with respect to both of the conduit elements coupled in a given coupling member, the entire expansion of both conduit elements would have to be taken up in that coupling member without abutment of the ends of the conduit elements. For this reason, there is a substantial space 22 provided between the ends of the conduit elements in assembled but unexpanded condition. As shown in FIGURE 5, the conduit elements 6 have both expanded due to the absorption of liquid and the space between the adjacent ends has diminished as shown by 22a.

During the axial expansion of the conduits 6 into the positions shown in FIGURE 5, the spacer ring 10 has become deformed or crushed as illustrated. The resistance of the spacer ring to such deformation or crushing is insufficient to result in the development of a dangerously high compressive or flexural stress in the assembled conduit. Instead of the development of excessive forces within the asbestos-cement elements, the spacer ring 10 simply collapses and does not interfere substantially with axial expansion of the conduit elements.

As best seen in FIGURE 2, the spacing ring of the invention can conveniently be formed from paper, including an outside layer 23, an inside layer 24 and a corrugated intermediate layer 25, all of which layers are advantageously secured together by waterproof cement. An overlap or joint member 26, also preferably of paper, is positioned and cemented so as to overlay and secure together the ends of the strip bent to form the ring 10. As shown, the corrugations in the corrugated layer 25 are advantageously disposed parallel to the axis of the spacer and thus parallel to the axis of the conduit element on which the spacer is mounted. This arrangement of the corrugations contributes to the strength characteristics of the spacer ring so that it has sufficient strength to prevent crushing during normal assembly and insufficient strength to prevent crushing during axial expansion of the conduit element.

Without adequate spacing of the conduit elements and coupling members, failure of the assembled conduit can take place in several ways. If the ends of adjacent conduit elements come against each other before complete axial expansion has taken place, continued expansion develops considerable stress in the conduit elements. This stress may be released by fracture of the conduit elements. However, since the compressive strength of the material of the conduit elements is often quite high, it is more likely that the conduit elements will tend to flex. If this takes place by tending to bend a conduit element centrally, the result may be a crack in the conduit element wall. If the flexural release of the expansion stress takes place at a coupling, it may result either in one of the conduit elements moving partially out of sealing contact with its gasket or in breakage of the coupling member.

If the space between conduit elements is sufficient, there may still be failure if the space between the shoulder on the conduit element and the end of a coupling member is inadequate. In such circumstances, the shoulder will abut the coupling member during expansion and further expansion may lead to the application of considerable compressive stress. Again, this may lead to failure of the joint or breakage of the pipe.

In connection with the expansion of conduit elements of the kind here involved, it should be kept in mind that the principal reason for this expansion is the absorption of moisture. Changes in axial dimension due to changes in temperature are of relatively small magnitude compared to changes in axial dimension resulting from changes in moisture content. The conduit elements are normally assembled in air-dry condition, that is, their moisture content is in equilibrium with the surrounding atmosphere. However, when the assembled conduit is used for the transportation of fresh water, or sewage, or some other liquid absorbable by the material of the conduit, as soon as the conduit goes on stream its liquid content begins to rise. As this occurs the conduit expands axially and will continue to do so until the moisture content of the conduit is at a maximum.

From the foregoing it will be seen that the crushing strength or compressive strength of the spacer ring must be appropriately related to the compressive strength of the material of the conduit elements and couplings and also to the flexural strength of the assembled conduit. If the resistance to crushing of the spacer ring were greater than compressive strength of the asbestos-cement parts, the asbestos-cement parts would fail before the spacer ring. Similarly, if the compressive strength of the spacer ring is greater than the flexural strength of the assembly, the assembly would fail in flexure before the spacer would fail by crushing. Consequently, the compressive or crushing strength of the spacer must be less than the compressive strength of the material of the conduit element and coupling and also less than the flexural strength of the combined assembled conduit. It must be recognized, of course, that while the elements are often assembled in a ditch and thereafter covered with earth, which would materially increase the resistance to flexure of the assembly, they may also be disposed above ground and not externally prevented from flexing. Therefore, the spacer ring has a yield point in compression which is below the resistance to flexure of the assembly in open air.

Using the equipment above described, an assembly operation would proceed as follows. First, a coupling member 13 with gaskets 16, 16, positioned in the grooves thereof would be generally aligned with two conduit elements 6 positioned in general end-to-end relation. Next, a spacer ring 10 would be slipped over the reduced end portion 7 of each conduit element 6 and slid along the conduit element until the trailing edge 12 came to rest against the shoulder 9. Then one of the conduit elements and the coupling member would be telescoped toward each other until the coupling member came to rest against the leading edge 18 of the spacer ring. Thereafter, the other conduit element 6 with its spacing ring would be assembled with the coupling member and first conduit element. It, too, would be inserted into the coupling member until the spacing ring abutted the coupling member.

The spacing rings would remain in place on the conduit elements and would maintain the positive spacing of the elements notwithstanding the possibility that axial stress might be subsequently applied during assembly of another joint further along the line, or the possibility that the assembly might take place at a sharp upward angle, for instance over a steep hill, so that the weight of conduits and couplings would tend to push the assembly downhill and increase the axial force applied to the spacer rings at the bottom.

By making the spacer rings of corrugated paper it is possible to reduce the cost thereof to a minimum and the spacer rings are, therefore, economically disposable. They may be left in place on a conduit and it is not necessary for anyone to go back along a stretch of assembled conduit in order to collect the spacing means for re-use.

Furthermore, the spacer rings of the invention have the advantage that they do not require any special machining of the conduit elements or coupling members. Such machining is a relatively costly manufacturing operation and it is a distinct advantage to avoid it.

What is claimed is:

1. In combination with a coupling assembly comprising a sleeve type coupling member and a conduit element serving to convey a liquid, said conduit element being made of a material which absorbs said liquid and undergoes substantial axial expansion after being placed in service, said coupling member having a bore of diameter such that the end portion of said conduit element is freely slideable therein, the conduit element having abutment means spaced from the coupling end threof a predetermined distance, a spacing means mounted on the coupling end of the conduit element against said abutment means, the spacing means having a dimension transverse the conduit element which is greater than that of the bore in the coupling member to provide for abutment of the spacing means against the coupling member during telescopic assembly of the conduit element and coupling member, the spacing means being of a material capable of withstanding normal assembly force and thereby serving to limit normal assembly of the conduit element and coupling member and crushable by the force generated by axial expansion of said conduit element due to absorption of liquid, said spacing means, when subjected to the axial expansion force, assuming a collapsed condition of permanent deformation due to the application of crushing force beyond the yield point, and said spacing means in collapsed condition being incapable of exerting any appreciable force resisting the axial expansion force, the axial dimension of the spacing means being selected so that the axial expansion exhibited by the conduit element during maximum liquid absorption is accommodated by free travel of the coupling end of the conduit element axially into the bore of the coupling member.

2. A construction according to claim 1 in which the spacing means is formed in the shape of a ring of a plurality of layers of paper, at least one layer being corrugated with the corrugations generally parallel to the axis of the ring, the layers of paper being secured to each other by waterproof cement.

References Cited in the file of this patent

UNITED STATES PATENTS

| 2,302,244 | Morrell | Nov. 17, 1942 |
| 2,871,031 | Altemus | Jan. 27, 1959 |
| 2,893,756 | Sandstrom | July 7, 1959 |

FOREIGN PATENTS

| 571,169 | Belgium | Sept. 30, 1958 |